Aug. 8, 1967 R. J. ESPINOSA ETAL 3,335,314

HIGH FREQUENCY ELECTRON DISCHARGE DEVICE HAVING OSCILLATION SUPPRESSION MEANS

Filed Sept. 4, 1963 3 Sheets-Sheet 1

INVENTORS
ROBERT J. ESPINOSA
JOHN A. RUETZ
BY Harry E. Rine
ATTORNEY

INVENTORS
ROBERT J. ESPINOSA
JOHN A. RUETZ
BY Harry E. Aine
ATTORNEY

INVENTORS
ROBERT J. ESPINOSA
JOHN A. RUETZ
BY Harry E. Aine
ATTORNEY

United States Patent Office 3,335,314
Patented Aug. 8, 1967

3,335,314
HIGH FREQUENCY ELECTRON DISCHARGE DEVICE HAVING OSCILLATION SUPPRESSION MEANS

Robert J. Espinosa and John A. Ruetz, Palo Alto, Calif., assignors to Varian Associates, Palo Alto, Calif., a corporation of California Filed Sept. 4, 1963, Ser. No. 306,570
18 Claims. (Cl. 315—3.6)

This invention is concerned in general with high frequency traveling wave tubes and more particularly with oscillation suppression means therefor. Such traveling wave tubes and matching structures therefor are especially suitable for use in frequency agile radars, broadhand high power amplifiers and the like.

The present state of the art for high frequency high power traveling wave tubes employing a slow wave circuit such as the ring and bar circuit first described by M. Chodorow and covered by U.S. Patent No. 2,937,311 permits operation in high power ranges such as for example, 1 kw. peak power levels and up into the mw. range if suitable thermally conductive structures are employed for supporting the slow wave circuit. However, stability becomes a pronounced factor in limiting the power level and overall gain of such tubes since as the power level increases to higher values, higher order circuit modes become increasingly difficult to stabilizer and may seriously affect tube performance. When the tube is used, for example, as a high gain amplifier, voltage breakdown within the slow wave circuit due to high electric fields caused by buildup of resonant modes and consequent energy loss to these modes limits available energy for the fundamental mode thereby providing the rationale for the adverse limitations on tube power level and gain caused by the aforementioned higher order circuit modes. The efficiency and gain will be degraded as a result of limiting the circuit length to a value sufficiently low to provide stable operation at higher frequencies. Stability is an essential requirement for satisfactory operation of a tube employed as an amplifier. A T.W.T. can be considered stable if no outputs appear in the absence of an input signal and the frequency and amplitude of all outputs are dependent respectively on the frequency and amplitude of the input signal when present.

Higher order modes are especially troublesome mainly because the circuit is difficult to terminate for all mode configurations. Since it is essential that the fundamental mode of operation be well terminated, major emphasis is placed on this mode. The configuration resulting in exceptional terminating characteristics for one mode will not in general terminate other modes which will in general result in a resonant behavior existing in these other modes since diverse field patterns exist for the various modes.

The fundamental or lowest order mode of propagation for any periodic slow wave circuit is characterized by a particular field pattern in plane transverse to the direction of propagations which field pattern is independent of position along the axis of propagation. Higher order modes of propagation are herein defined as any propagation modes other than the fundamental mode which are also characterized by a particular field pattern in a plane transverse to the direction of propagation which field pattern is independent of position along the axis of propagation and which field patterns are each individually distinct and different from each other.

Circuit severs are generally employed as a help in the elimination of instabilities resulting from this resonant behavior. However, if the use of circuit severs is made exclusively to obtain stability it has proven that this will be a serious limiting factor with respect to operating efficiency and high gain operation.

Stability of traveling wave tubes is further adversely affected by backward wave oscillations which oscillations are a source of degradation in amplifier efficiency and performance and means to suppress such backward wave oscillations in traveling wave tubes operating as forward wave amplifiers are constantly being sought. For example, a typical prior art technique for suppression of backward wave oscillations involves a scheme such as multiple circuit severs. However, this prior art scheme involves the sacrifice of efficiency and gain as mentioned above.

The construction of high gain, high power traveling wave tubes is further complicated by the problems of providing adequate coupling means for the R.F. circuits in order to match the slow wave circuit impedance for the fundamental operating mode and prevent reflected waves from interfering with amplifier operation. Another problem encountered in designing high power electron discharge devices involves the provision of adequate mechanical mounting arrangements between parts made of materials with widely different thermal expansions. Cracking of the vacuum envelope and distortion of precision assemblies results unless means are provided for relief of the thermal stresses resulting from the large differential expansions occurring when the device, or assemblies thereof, are raised to high temperatures during assembly or processing. Such problems are encountered where materials suitable for magnetic field shaping pole pieces are joined to non-ferrous materials which are suitable for slow wave circuits and electron beam collectors.

Another problem faced by the designer of high power electron discharge devices such as the traveling wave tube employing a severed slow wave structure for stability considerations involves adequate coupling means for removing the R.F. energy from the slow wave circuit at the circuit sever. This may be done by attenuating the energy on the slow wave circuit or coupling it to a resistivity terminated transmission line. The latter is preferable in that it occupies a shorter portion of the axial length of the tube. Provision should be made at the point of circuit sever to terminate all R.F. energy in the main operating mode propagated in the forward direction and to eliminate all reflected R.F. energy emanating from the R.F. output section or from the next severed section in the case where multiple severs are employed. Furthermore, the problem of dimensional changes between the physical dimensions of the R.F. coupler section at the circuit sever occurring after cold test and/or tube assembly must be considered and means for compensating for these changes must be provided. These and other problems find a solution in the present invention.

In the present invention a slow wave circuit with certain physical parameters thereof tapered along the circuit length is provided as a solution to the problem of resonant circuit oscillations for higher order modes peculiar to the particular circuit geometry involved. The utilization of tapered circuit parameters along the length of the circuit (tapering both the ring and stub parameters along the circuit length) has been found particularly advantageous in eliminating resonant circuit oscillations in both the ring mode and the stub mode (modes of propagation on the circuit for which the upper cut-off frequencies are determined by the diameter of the circuit rings and the support stub lengths respectively) in a stub supported ring and bar circuit.

The present invention provides a solution for unwanted backward wave oscillations existing in a forward wave amplifier by employing a loading slow wave structure coupled to the main slow wave structure and comprising a linear array of pins or a series of thin parallel plates, or slotted conducting ridge. By suitable dimensioning of the height and spacing of the paralleled structure such that it has a phase velocity approximately equal to the phase velocity of the main slow wave structure over the frequency band where backward wave oscillations occur, such oscillations are eliminated. Thus, a resultant structure is evolved which is non-propagating over the frequency band where backward wave oscillations occur since the combined structures form a stop band over this frequency band.

The present invention provides a solution to the problem of adequate R.F. coupler means by employing a novel and greatly simplified coupling arrangement for a ring and bar structure which includes a ferrule or ring positioned in the ground plane at the end of the ring and bar circuit. This ferrule is dimensioned and positioned relative to the opposing ring such that optimum impedance matching characteristics over the operating frequency range of the tube are obtained between the slow wave circuit and the R.F. coupler means. An output waveguide step is provided to match the antenna impedance to the output guide impedance.

The present invention further provides a novel differential thermal coefficient of expansion compensating means which eliminates breaking or cracking and consequent vacuum loss at the pole pieces to tube joints near the R.F. output. This compensating means involves positioning a copper, or other suitably ductile material, ring between the pole piece and the tube main body portion to form a support for the collector which permits high temperature cycling of the tube without danger of cracking occuring between the pole piece and tube main body due to differential thermal stresses therebetween.

The object of the present invention is to provide novel oscillation suppression means impedance matching means and construction techniques for a high power electron discharge device, such as, for example, a traveling wave tube, wherein the employment of such means and techniques permit operation of the device at high power levels with a virtual absence of troublesome resonant circuit oscillations, backward wave oscillations and structural deficiencies which might adversely affect tube operation.

One feature of the present invention involves selectively tapering specific physical parameters of a slow wave circuit incorporated in an electron discharge device in order to virtually eliminate undesirable resonant circuit oscillations thereby greatly enhancing the stability of the device over the operating ranges thereof.

Another feature of the present invention involves combining the above mentioned selective tapering feature with a circuit sever whereby backward wave oscillations and reflected waves are also eliminated in addition to the resonant circuit oscillations thereby further enhancing the stability of the device over the operating ranges thereof.

Another feature of the present invention is the provision of novel pole piece to electron discharge device main body support means which functions as a differential thermal coefficient of expansion compensating means thereby permitting high temperature cycling of said device with minimal danger of cracking occurring in the vicinity of said support means and the bonded joints thereof.

Another feature of the present invention is the provision of novel circuit structures coupled to a main slow wave circuit wherein said circuit structures are specifically dimensioned such that a stop band is created by the resultant circuits over the frequency band where backward wave oscillations previously existed in the absence of said coupled circuit structure.

Another feature of the present invention is the provision of novel R.F. coupler means which includes a stepped waveguide section for optimizing the impedance match between a slow wave circuit and antenna and a waveguide coupled thereto.

Another feature of the present invention is the provision of novel R.F. coupling means for traveling wave tubes located at a circuit sever or terminating ground plane, said R.F. coupling means including a ferrule or ring member which is positioned in the ground plane forming the circuit sever or other termination where R.F. energy is coupled from said slow wave circuit in such a manner and dimensioned so that an optimum impedance match is obtained between thet slow wave circuit and the R.F. coupling means over the operating frequency range of the tube.

Other features and advantages of the present invention will become more apparent upon a persual of the following specification taken in conjunction with the accompanying drawings wherein, FIG. 1 is a fragmentary longitudinal cross sectional view, partly in elevation, of a high power traveling wave tube incorporating certain of the novel features of the present invention;

Figures 11, 12, 13, 14, 15:
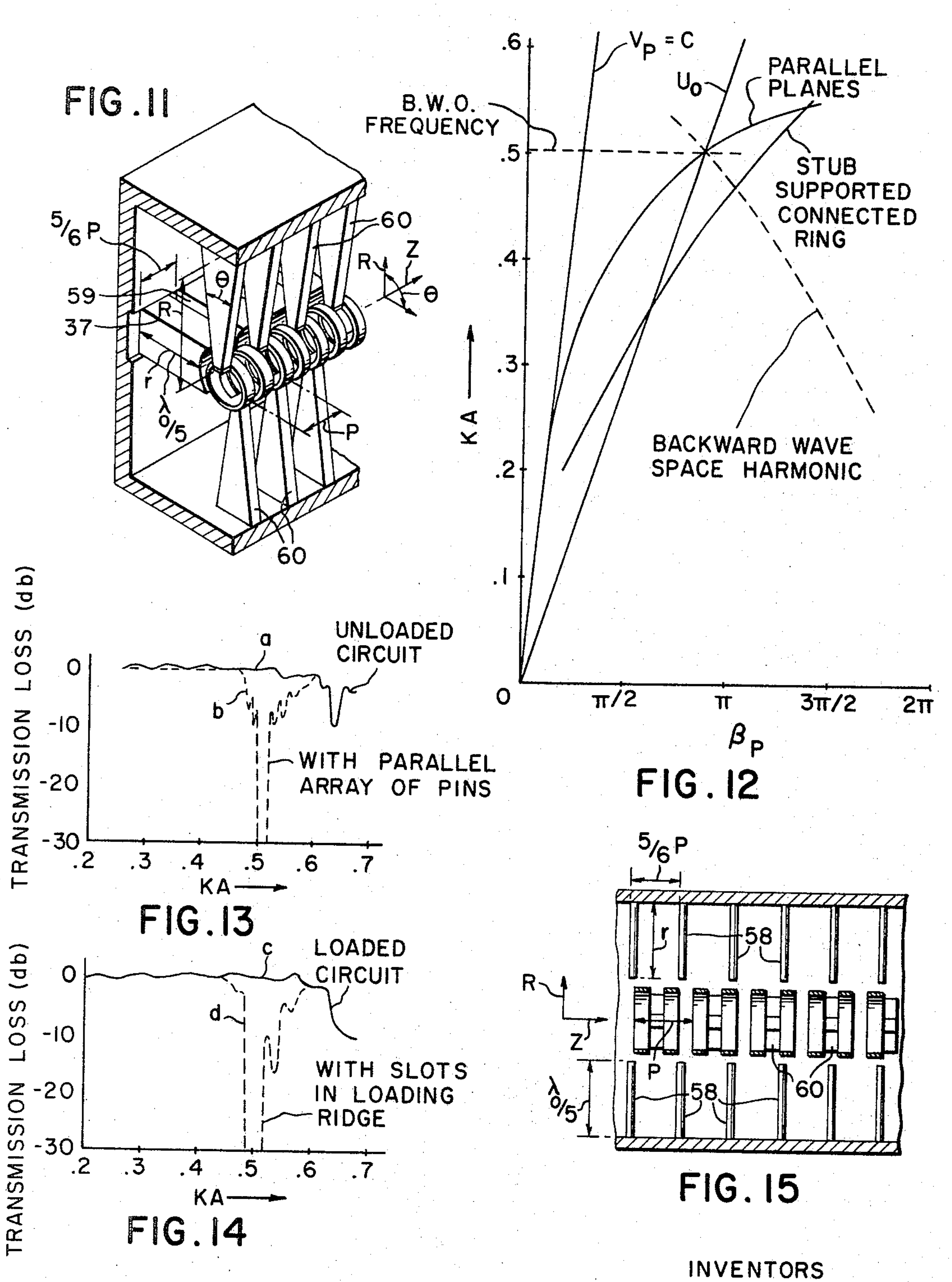
FIG. 11 is a perspective view of a stub supported ring and bar circuit, wherein spaced notches are cut in a coupled loading ridge in such a manner that a stop band is introduced in the resultant structure over the frequency band wherein backward wave oscillations normally exist in the absence of the notched coupled loading ridge.
FIG. 12 is a W–B diagram of a stub supported connected ring circuit (ring and bar circuit) showing the first backward wave space harmonic mode and the fundamental forward wave modes of the structure in the absence of coupling for the paralleled loading circuit structure.
FIG. 13 is a graphical portrayal of circuit transmission loss vs. normalized frequency of a stub supported connected ring circuit with and without a paralleled loading circuit of spaced parallel pins.

FIG. 14 is a graphical portrayal of circuit transmission loss vs. normalized frequency of a stub supported connected ring circuit loaded with a parallel ridge in one case and with a slotted parallel ridge in the other case; and FIG. 15 is a cross sectional view of a stub supported ring and bar slow wave circuit paralleled by a coupled array of spaced pins which function to create a stop band in the resultant structure over the frequency band wherein backward oscillations normally exist in the absence of the paralleled pins.

Figure 1:
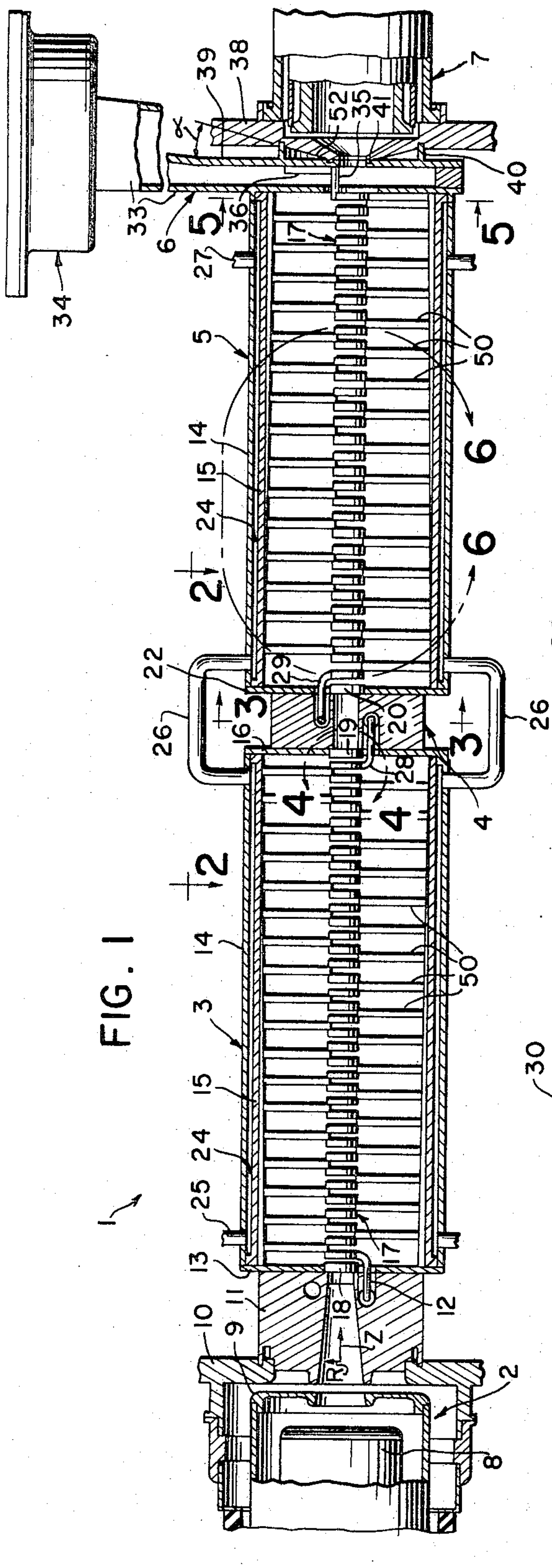
Figure 4:
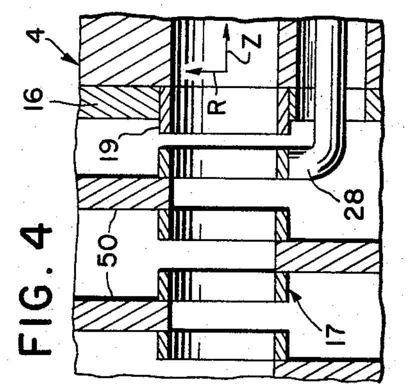
FIG. 4 is an enlarged fragmentary cross sectional view of a portion of the structure of FIG. 1 delinated by line 4—4 and depicting the novel R.F. coupler section and ferrule at the circuit sever ground plane.
Figure 3:
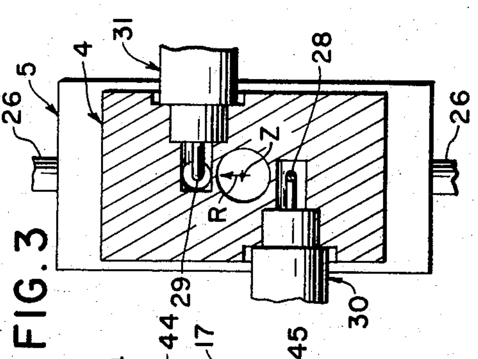
FIG. 3 is an enlarged fragmentary cross sectional view partially in elevation taken along lines 3—3 of FIG. 1 depicting the circuit sever and R.F. couplers therefore of the traveling wave tube.
Figure 2:
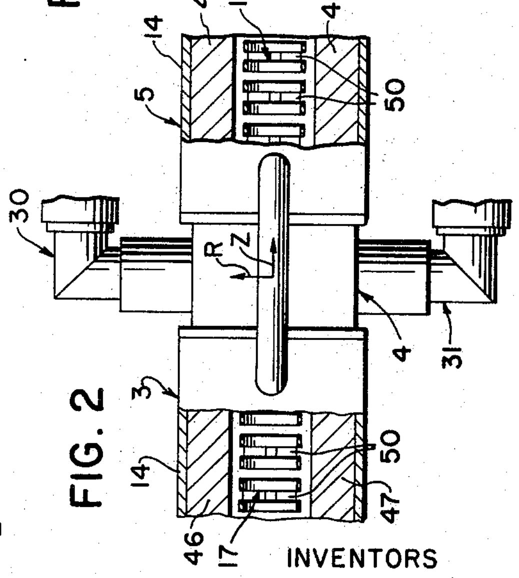
FIG. 2 is an enlarged fragmentary plan view partially cut away taken along lines 2—2 of FIG. 1 depicting the center section of the traveling wave tube.

Referring now to the drawings there is shown in FIG. 1 a traveling wave tube 1 having an electron gun assembly 2, a first slow wave circuit section 3, circuit sever section 4, second slow wave circuit section 5, R.F. output section 6 and collector assembly 7. Any suitable cathode structure 8 may be incorporated in the electron gun section 2 and a modulating anode 9 may be included therein as shown. Pole pieces 10 of a magnetic material such as cold rolled steel and a copper second anode 11 complete the upstream end of the traveling wave tube. A coaxial coupler 12 for R.F. input energy is positioned in the second anode 11 and comprises a coaxial center conductor attached to the first ring of the ring and bar slow wave circuit 17. The terms ring and bar and connected ring are used synonymously herein. An impedance matching ferrule or ring 18 is centered in the end wall ground plane 13 to serve as an impedance matching adjustment for the slow wave circuit and the R.F. input coupler. Similar ferrules 19 and 20 are located at the end wall ground planes 16, 22 respectively and similarly function as impedance matching means. Similar rectangular waveguide U shaped shells 14, best shown in FIG. 6, having cooling channels 24 formed by means of stepped side walls 15 extending along the length thereof serve heat sink, biasing and supporting functions. Inlet, coupling and outlet cooling conduits 25, 26, 27, best shown in FIGS. 1, 2 and 3 serve to transfer cooling fluid along the length of the tube. Shell 14 forms the exterior confining surface for cooling channels 24 and as the vacuum envelope. The ring and bar structure is preferably of a low loss high conductivity metal. The stepped side walls 15 are preferably of copper, and the exterior shell 14 and end walls 13, 16, 22 are preferably of a high strength weldable material such as Monel or stainless steel. R.F. energy couplers 30, 31 (see FIG. 2) are located at the circuit sever 4 and comprise coaxial center conductors 28, 29 oppositely directed and conductively attached to the circuit rings as shown. The coaxial conductor 28 serves to couple R.F. energy from the initial slow wave circuit section 3 to an exterior load (not shown) where it is absorbed and coaxial conductor 29 serves to couple any reflected R.F. energy from the second slow wave circuit section 5 to an external load where it is absorbed. Slow wave circuit section 5 is substantially identical to the first section 3 with the exception of the orientation of the tapered supporting stub and ring dimensions. Orientation is used to indicate the variation of the R dimensions of the stubs in relation to the Z-axis along the length of the tube.

The ring and bar slow wave circuit sections are ridge loaded (see FIG. 2) by ridges 44, 45, 46, 47 and stub 50 supported and function as shown and described in copending application U.S. Ser. No. 295,605, now U.S. Patent No. 3,142,777 issued July 28, 1964 by John W. Sullivan assigned to the same assignee as the present invention. The operation of a ring and bar slow wave circuit is described in U.S. Patent No. 2,937,311 by M. Chodorow.

The output section 6 includes waveguide 33, vacuum window assembly 34, R.F. output antenna 35 and impedance matching step 36. Output pole piece 38 is brazed or the like to the broad wall 39 of output guide 33 and a collector assembly 7 is mounted thereon.

An expansion ring 40 spans between the waveguide broad wall 39 and the opposing wall of the pole piece 38. The ring 40 being of a ductile material such as copper permits differential thermal expansion between materials such as copper and cold rolled steel which are preferably used for the waveguide 33 and the pole piece 38 respectively, while minimizing the possibilities of cracking and consequent loss of vacuum therebetween from occurring during operation of the tube. This function is accomplished due to the ductile nature of the material employed for ring 40 which will maintain a vacuum seal between the pole 38 and broad wall 39 regardless of whether or not a crack might develop in the brazed joint 41 at the beam aperture. An acute angle $\alpha$ is formed between said wall 39 and the tapered face 52 of said pole piece 38 to form a gradually increasing space therebetween as measured outwardly from the brazed joint 41 at said central aperture.

A plurality of impedance matching ferrules or ring members 18, 19, 20 are positioned the R.F. input and circuit sever sections as shown. These ferrules permit control of the R.F. coupling and function as impedance compensating means in the following manner. After the first slow wave circuit section 3 is assembled and while cold tests are being run the ferrules are axially moved until an optimum impedance match at each of the R.R. coupling sections is obtained thus minimizing energy reflections therefrom. Conventional V.S.W.R. measurements in the output circuit are made to determine when an optimum match has been achieved.

Figures 5, 6, 7, 8, 9, 10:
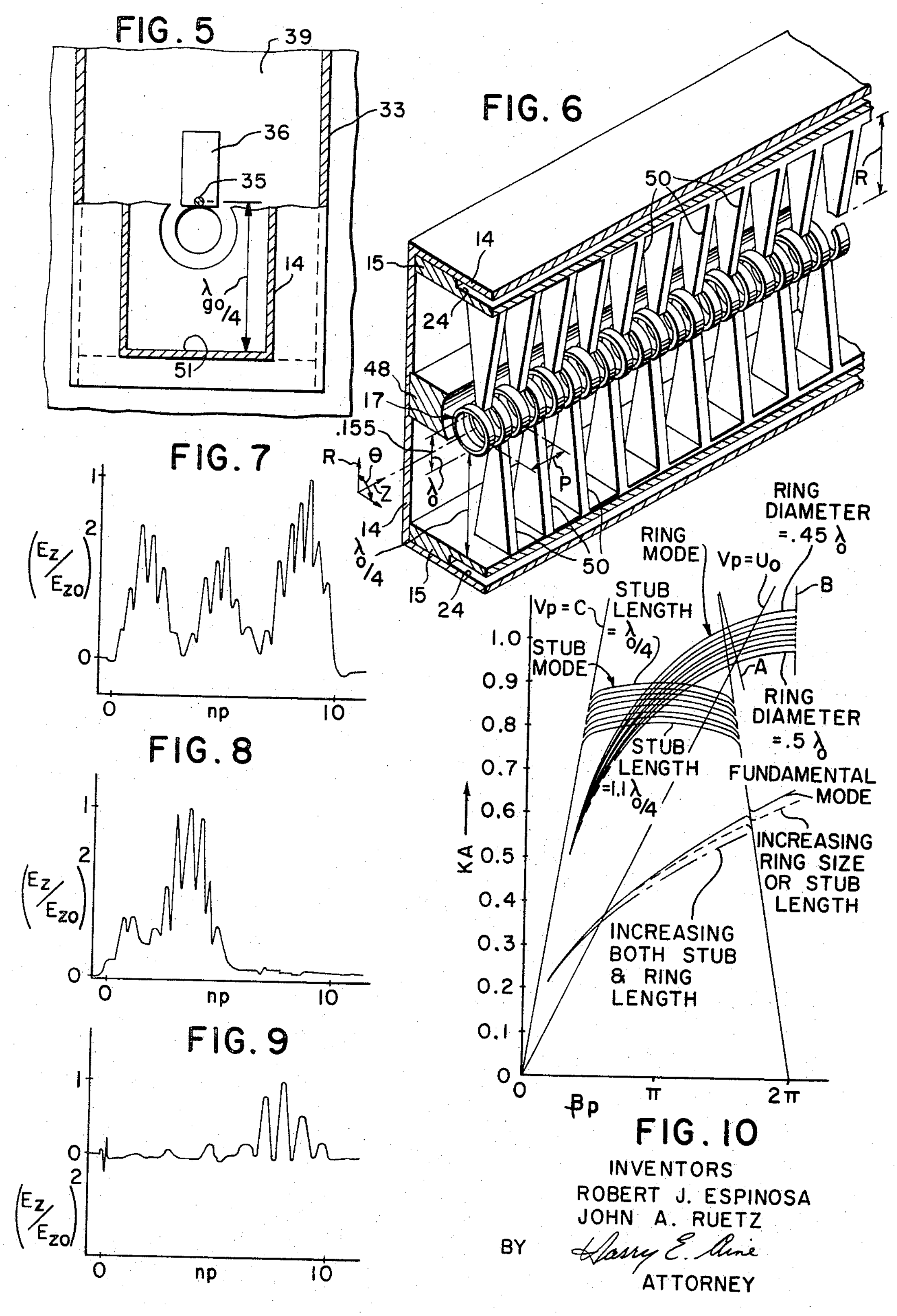
FIG. 5 is an enlarged fragmentary cross sectional view partially in elevation taken along the lines 5—5 of FIG. 1 depicting the novel output R.F. section of the traveling wave tube.
FIG. 6 is a perspective view of a slow wave circuit having the novel resonant circuit oscillation suppression means incorporated therein.
FIG. 7 is a typical graphical portrayal of the axial R.F. electric field along a resonant 10 section stub supported, ridge loaded ring and bar circuit having uniform (or non-tapered) physical circuit parameters.
FIG. 8 is a graphical portrayal of the same resonant 10 section ring and bar circuit represented by FIG. 7 showing the resultant perturbations of the axial electric field when transverse tapering of the circuit ring diameters is employed as a stability technique.
FIG. 9 is a graphical portrayal of the same resonant 10 section ring and bar circuit represented by FIG. 7 showing the resultant perturbations of the axial electric field when transverse tapering of the circuit stubs is employed as a stability technique.
FIG. 10 is a composite W–B diagram of several stub supported, ridge loaded ring and bar circuits found by resonating ten sections of several such circuits with different support stub lengths and ring diameters, showing the effect of changing these dimensions on the modes of the circuit.

The utilization of stepped transformer section 36, as best shown in FIGS. 1 and 5, on internal face of broad waveguide wall 39 provides an optimum impedance match between the output waveguide 33 and the antenna 35 over the operating range of the tube. A distance of $\lambda g_{o/4}$ is maintained between antenna 35 and the backwall 51 of the output guide as shown in FIG. 5 where $\lambda g_o$=waveguide wavelength at the center frequency of the operating band. The height and length of the step 36 are varied and V.S.W.R. measurements are made in the output guide to determine when optimum step dimensions exist.

Directing our attention to FIG. 6 a perspective view of the slow wave circuit section 5 is shown. Since section 3 and 5 are similar except for the orientation of the transversely tapered stub R dimensions, as previously mentioned, FIG. 6 is representative of both sections 3 and 5. Furthermore, the novel tapered dimensional parameters of the slow wave circuit for stability purposes can be used in traveling wave tubes without circuit severs.

The slow wave circuit with loading ridge 48 depicted in FIG. 6 is essentially identical to the slow wave circuit disclosed and claimed in copending U.S. Ser. No. 295,605, now U.S. Patent No. 3,142,777 issued July 28, 1964 by John W. Sullivan, assigned to the same assignee as the present invention, as far as thermal and basic propagation characteristics are concerned. However, the circuit of FIG. 6 provides by the tapered stub and/or ring transverse dimensions along the circuit length a means to suppress highly undesirable resonant circuit oscillations which degrade operation at high power levels. The taper causes the start oscillation current $I_{st}$ for the undesired resonant circuit oscillations to be increased to a value exceeding the beam current $I_o$ over the operating range of the tube. The $I_{st}$ for any particular circuit mode is determined by the inherent attenuation of the system (beam and circuit) existing for the particular mode involved. The $I_{st}$ for any particular mode in which resonant circuit oscillations occur such as the stub mode is raised by limiting the resonant electromagnetic field region for a particular frequency or range of frequencies, of a specific circuit resonance to a small portion of the total circuit length. This method of raising the $I_{st}$ for various undesirable resonant circuit oscillations for a particular slow wave circuit does not adversely perturb the main operating mode. Selectively tapering specific slow wave circuit parameters accomplishes the above mentioned results of limiting the region of resonant electromagnetic fields. By varying the transverse lentgh R of the stubs 50 along the axial extent Z of the slow wave circuit the normal $I_{st}$ for oscillations in the stub mode can be raised to a current level exceeding the current level for $I_0$ over the desired range of operation. The mechanism by which this is accomplished can be defined as dispersing or staggering the normal frequency $f_n$ where circuit resonances occur over a wide band thus creating multiple resonant circuit frequencies $f_m$ in the particular undesired mode wherein the fields of the circuit at each of the multiple frequencies resulting is restricted to only a small portion of the total circuit length. Thus the gain factor for each of the $f_m$ is correspondingly reduced by a factor approximately equivalent to the reduction in active circuit length for each $f_m$ over that originally existing for $f_n$ due to the tapered R dimensions of the circuit. Thus in effect, the $I_{st}$ is raised by a factor approximately equal to the ratio of the total circuit length to the active circuit length at any particular $f_m$. This technique permits extremely simple fabrication processes to be used and does not result in any serious perturbation of the main operating mode.

It has been determined that in a ridge loaded stub supported ring and bar circuit such as shown in FIG. 6 that a number of modes exist which present serious stability problems at high power levels of operation. The stub mode mentioned above is one of these undesired modes. Another undesired mode is the ring mode at the normal operating voltage. This mode is susceptible to the same stability techniques employed to stabilize the stub mode. Namely, by tapering the radii of the rings along the axial extent of the circuit, the ring mode $I_{st}$ is raised by a factor approximately equivalent to the reduction of active circuit length resulting, without adverse perturbation of the main operating mode.

FIG. 7–9 graphically portray the axial electric fields $E_z^2$ normalized with respect to the peak axial field $E_{zo}^2$ vs. $nP$ where $P$=periodic length and $n$=number of periodic lengths, as measured in cold test structures with a square law detector and employing respectively; uniform circuit dimensions; tapered ring diameters along the axial extent of the circuit with uniform stubs; and tapered stub length R along the axial extent of the circuit with uniform ring diameters. It is obvious that with uniform transverse or non-tapered dimensions as shown in FIG. 7 there is a significant energy storage along the entire axial extent of a resonant 10 section (number of periodic lengths $P$=10) ring and bar circuit. FIG. 8 points out the significant reduction in energy storage occurring along the axial extent of the circuit when the circuit ring diameters are tapered at the rate of 0.6% per period, P, along the axial extent of the circuit. It is observed that appreciable energy storage exists only over approximately ¼ of the axial extent of the 10 section circuit. FIG. 9 shows the effect of a 0.6% per period taper of the stub length R parameter along the axial extent of a resonant 10 section ring and bar circuit. It is again apparent that a significant reduction in energy storage over the circuit length occurs. The above illustrations present graphic portrayals of the advantages of the resultant reduction in energy storage along the circuit length when the novel tapered concepts are employed.

FIG. 10 is a normalized W–B diagram showing the effect on the main operating mode which in this case is a fundamental forward wave, of tapering the ring and stub parameters along the axial length of the circuit. Also depicted therein is a graphical portrayal of the staggering or dispersion of the ring and stub modes in a ring and bar circuit when tapers of 0.6% per period are employed. The upper and lower dimensions of the ring diameter and stub lengths for resonant 10 section circuits are shown. It is readily seen that little effect on the fundamental mode results from employing either tapered rings and/or stubs. A slight depression in normalized frequency KA over the operating range is the only apparent result. However, the dispersion of the individual ring and stub mode resonances into a plurality of frequency spaced multiple resonances is apparent. Thus a significant advance in the state of the art with respect to stabilizing stub supported ring and bar circuits results. The following relationships are used for the diagrams of FIGS. 10, 12, 13 and 14;

$$KA=\frac{2\pi f A}{C}$$

where $f$=frequency, $A$=average circuit ring radius, $f_o$=center frequency of the operating band and $C$=vel. of light and wherein $$\lambda_o=\frac{f_o}{C} \text{ and } \beta=\frac{\omega}{v_P}$$

where $v_P$=circuit phase velocity $\omega=2\pi f$ and $P$=periodic length $\cong\lambda_e/3$ where $$\lambda_e=\frac{U_o}{f_o}$$

and $U_o$=electron beam velocity.

Three exemplary high power traveling wave tubes such as shown in FIG. 1, employing two 18 section ridge loaded, stub supported ring and bar slow wave circuits separated by a sever were built and tested. One of the tubes has uniform stub and ring dimensions, the second tube has a 10% or 0.6% per period stub length R taper along the axial extent of the tube and uniform circuit ring dimensions, and the third tube has a 10% or 0.6% per period ring diameter taper along the axial extent of the tube as well as the 10% or 0.6% per period stub taper. Dimensional parameters of .155$\lambda_o$ for the exterior ring diameter and $\lambda_{o/4}$ for the stub R dimension, where $\lambda_o$ is determined at the center of the operating band, were used for the uniform circuits and stub mode $I_{st}$ in a beam voltage $V_o$ range of 23 to 38 kv. were observed to be 1.5 amps. The tube with a .6% per period stub taper along the circuit sections with uniform ring dimensions, where a stub length of $\lambda_{o/4}$ was used at the R.F. input of circuit section 3 and a stub length of $\lambda_{o/4}$ was used at the R.F. output of circuit section 5, had the stub mode $I_{st}$ raised above 10.6 amps and confined to $V_o$ of 36 to 40 kv., but had ring mode oscillations starting at 2.5 amps. The tube with both a .6% per period ring taper and a .6% per peroid stub taper along the circuit sections, where a ring diameter of .155$\lambda_o$ was used at the R.F. input of circuit section 3 and a ring diameter of .155$\lambda_o$ was used at the R.F. output of circuit section 5 had ring mode $I_{st}$ raised to a level so far above the normal operating $I_o$ of 14 amps that measurements of $I_{st}$ could not safely be made. In each of the above cases P was equal to $U_o/3f_o$.

When a circuit sever is utilized as in FIG. 1 it is advantageous to arrange the tapers of the circuit parameter with decreasing R and in order to take advantage of the decrease in phase velocity on the tapered circuit, permitting the circuit wave to be held closer to synchronism with the beam wave near the output end of the tube.

Reference to FIG. 1 shows that the orientation of the taper of slow wave circuit section 3 along the Z-axis is opposite to the orientation of the taper of section 5. This is relatively arbitrary as far as section 3 is concerned since the beam is not appreciably slowed down in this section and synchronism is not a serious problem. However, in section 5 the beam is significantly slowed and synchronism is a problem as mentioned above.

FIG. 10 shows that stub mode oscillations are restricted to a fairly narrow bandwidth of approximately 2% centered about a frequency at which the stubs are a half wave length long. Thus only a relatively small taper of approximately 0.6% per period along the axial extent of the circuit is required to adequately raise the $I_{st}$ for this mode and has no adverse effect on the main operating mode. On the other hand the ring mode is shown to be a wide band mode, however, the beam can only interact with that portion of the mode which has a very low group velocity $V_g$ such as the heavy region bounded by lines A–B on FIG. 10. The remaining portion in FIG. 10 was capable of oscillations only at beam velocities which approached the speed of light as evidenced by the nearness of the $V_P=C$ characteristic and the wide band portion of the ring mode characteristic. Thus the wide band portion of this mode can be ignored since the beam velocities required to excite oscillation over this frequency range are too near the speed of light to be practical and are therefore, normally not employed in high or low power traveling wave tubes. Therefore, again, as in the case of the stub mode, only a minimal degree of taper is required to raise the $I_{st}$ for the ring mode to a value where complete oscillation suppression thereof is achieved over the normal operating range of the circuit. This is extremely advantageous since the dispersion characteristic of the fundamental mode is extremely important for purposes of obtaining efficient wideband operation. Tapers of greater than 0.4% per period and preferably tapers of approximately 0.6% per period yield optimum results.

The present invention further provides a solution to all oscillations occurring in higher order resonant circuit modes. For any given T.W.T. and slow wave circuit configuration there will exist particular higher order modes which are functions of the physical and electrical perameters of the slow wave circuit and T.W.T. Each individual mode has a particular ($I_{st}$) as outlined above in detail with respect to the ring and stub higher order modes. Thus by a process of trial and error one can by selectively tapering the transverse dimensions of a given slow wave circuit determine what taper is required to adequately raise the $I_{st}$ for a given troublesome higher order mode to a value such that the operating beam current $I_o$ will not not induce resonant circuit oscillations for any poorly matched higher order mode.

In FIG. 11 a plurality of parallel loading planes 37 or a slotted loading ridge 37 is coupled to the stub 60 supported ring and bar circuit for the purpose of suppressing backward wave oscillaitons (BWO).

Backward wave oscillations in a traveling wave amplifier tube may be suppressed by making the slow wave circuit non-progagating at the BWO frequency. The coupled loading circuit 37 as proposed here makes a connected ring circuit non-propagating over a frequency band, thereby suppressing the backward wave oscillations at those frequencies within the band.

In a traveling wave amplifier using a connected ring circuit, backward wave oscillations occur at the frequency at which the electron beam is synchronous with the first backward wave space harmonic. Since the beam interaction impedance for the first backward wave space harmonic is a significant fraction of impedance of the fundamental forward wave, backward wave oscillations occur even with relatively short lengths of circuit. In order to obtain more than a few db of stable gain it has been conventional to construct the tube in two or more terminated sections. Making a tube in short sections is deleterious to efficiency and requires complicated construction, therefore, it is desirable to suppress the BWO's in some other manner.

Suppression of backward wave oscillations by making the circuit non-propagating at the backward wave oscillation frequency has been highly successful in tubes using a single helix. By periodically notching the helix tape, the normal modes of the helix are perturbed so that the helix is non-propagating for frequencies of which the phase shift per section is near $\pi$ radians. See in this respect, copending applicaion U.S. Ser. No. 79,893 by Robert L. Rorden, now U.S. Patent No. 3,200,286 issued Aug. 10, 1965, assigned to the same assignee as the present invention. The transmission characteristic of the helix then exhibits a stopband centered at that frequency. A connected ring structure can not readily be modified in this simple manner, but similar effects are obtained by coupling the circuit with other propagating circuit structures.

A structure used for this purpose must have a phase velocity approximately the same as the connected ring circuit over the band which it is intended to reject. Then coupling between the modes of the two circuits can occur which will make the combined structure non-propagating. The stop band obtained in this manner is not confined to a particular part of the connected ring structure passband but is adjustable with the parameters of the coupled structure.

Preferred dimensions for the slotted ridge or spaced parallel planes shown in FIG. 11 are ridge height $r=\lambda_{o/5}$, stub angle $\theta=\pi/8$, ring diameter$=0.155\lambda_o$, stub length $R=\lambda_{o/4}$ wherein $\lambda_o$ is determined at the mid band operating frequency, and $$P=\frac{U_o}{3f_o}$$

FIG. 15 depicts a stub supported ring and bar circuit similiar to that of FIG. 11 but differing therefrom in the particular coupled circuit utilized to suppress BWO's. In this instance a plurality of spaced pins 58 periodically spaced at ⅚ P along the Z dimension having a $r$ dimension of $\lambda_{o/5}$ function as the coupled loading structure. Again P is equal to $U_o/3f_o$.

FIGS. 13 and 14 portray circuit transmission loss vs. KA for the circuits of FIG. 15 and 11, respectively.

In FIG. 13 characteristic $a$ depicts a stub supported ring and bar slow wave circuit without loading to a coupled circuit and the absence of any stop band within the operating band is apparent. Characteristic $b$ depicts the effect on transmission characteristics when an array of spaced loading pins 58 having a ⅚ P spacing as shown in FIG. 15 are introduced. It is readily apparent that a stopband occurs at a KA of approximately 0.5 which referring now to FIG. 12 corresponds to the frequency where BWO's occur thereby effectively suppressing BWO's. In FIG. 14 characteristic $c$ depicts a ridge loaded stub supported ring and bar slow wave circuit such as shown in FIG. 11 but without the slots 59. It is apparent that no stopband at the frequency where BWO's occur, namely KA of approximately 0.5 exists. The introduction of a plurality of slots 59 spaced ⅚ P along the length of the circuit introduces the desired stopband at approximately 0.5 KA as shown by characteristic $d$. The propagation characteristics of an array of pins or planes, such as shown in FIG. 15, are determined primarily by their length and spacing. This fact is exploited by shaping the planes to form the circuit loading ridge as shown in FIG. 11.

Since the introduction of a loading ridge or ridges is practically speaking a requirement when stubs having appreciable thermal capacity are used to support a ring and bar structure because of the necessity of reducing the dispersion characteristics of the circuit which are adversely increased by the introduction of the stubs, the present invention provides an extremely simplified method of eliminating the problem of BWO's without any additional circuit structure being required.

It is to be noted, of course, that plural or single slotted ridges and arrays of pins or parallel planes are within the scope of the present invention. It is further noted that the present invention is not restricted to tapered height stub support ring and bar circuits since the slotted ridge or spaced arrays of pins or spaced parallel planes may equally advantageously be employed in ring and bar slow wave circuits having linear radial stubs or linear or tapered tangential stubs or in ring and bar circuits without electrically conductive supporting stubs such as non-conductively supported circuits, such as shown and described in U.S. Patent 2,937,311 by M. Chodorow and in other known slow wave circuit configurations.

Furthermore, a composite ring and bar structure incorporating both the resonant circuit oscillation suppression means and the BWO suppression means is obviously advantageously constructed according to the teachings of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A traveling wave tube device comprising an electron gun structure adapted and arranged to generate and direct an electron beam along a predetermined line of circuit development, a slow wave circuit operatively connected at the one end thereof to said electron gun structure and disposed along said predetermined line of circuit development, a collector structure adapted and arranged to dissipate the thermal energy of an impinging electron beam operatively connected to the other end of said slow wave circuit, said slow wave circuit including a first stub supported ring and bar type circuit section, a circuit sever operatively connected at the one end thereof to said first circuit section, a second stub supported ring and bar type circuit section operatively connected to the other end of said circuit sever, each of said slow wave circuit sections being capable of propagating a band of high frequency energy along the axial extents thereof, loading means spaced from and paralleling each of said slow wave circuit sections along the length thereof, said loading means adapted and arranged to suppress backward wave oscillations, which in the absence of said loading means would otherwise be induced on said slow wave circuit at the particular frequency band within said band wherein said backward wave oscillations are normally induced, resonant circuit oscillation suppression means extending along the length of each of said circuit sections, said resonant circuit oscillation suppression means being adapted and arranged to suppress ring mode and stub mode oscillations over the operating frequency and power ranges of said device.

2. A traveling wave tube device comprising an electron gun structure adapted and arranged to generate and direct an electron beam along a predetermnied line of circuit development, a periodic slow wave circuit operatively connected at the one end thereof to said electron gun structure and disposed along said predetermined line of circuit development, a collector structure adapted and arranged to dissipate the thermal energy of an impinging electron beam operatively connected to the other end of said slow wave circuit, said slow wave including a first stub supported ring and bar type circuit section, a circuit sever operatively connected at the one end thereof to said first circuit section, a second stub supported ring and bar type circuit section operatively connected to the other end of said circuit sever, each of said slow wave circuit sections being capable of propagating a band of high frequency energy along the axial extents thereof, loading means spaced and paralleling each of said slow wave circuit sections along the length thereof, said loading means being periodic and having a different periodicity than said stub supported ring-and-bar circuit sections.

3. An electron discharge device including a slow wave circuit comprising a ring and bar type slow wave circuit capable of propagating a band of high frequency energy along the axial extent thereof, said ring and bar type circuit adapted and arranged such that ring mode resonant circuit oscillations are capable of being supported thereon in a particular portion of said band of high frequency energy, said ring and bar circuit having means for suppressing said ring mode resonant circuit oscillations over said particular portion of said band of high frequency energy where said ring mode oscillations would normally occur, said means for suppressing said ring mode resonant circuit oscillations including constructing said rings such that the diameters thereof are dimensionally tapered along the axial extent of said slow wave circuit.

4. The device of claim 3 wherein said taper is greater than 0.4% per period as measured along the axial extent of said slow wave circuit.

5. An electron discharge device including a slow wave circuit comprising a stub supported ring and bar type slow wave circuit capable of propagating a band of high frequency energy along the axial extent thereof, said stub supported ring and bar type circuit being disposed about an elongated central beam axis, said support stubs having their major length axis disposed in a plurality of spaced transverse planes with respect to said elongated central beam axis and at least certain of said stubs having different length dimensions.

6. The device defined in claim 5 wherein said stubs having different length dimensions form a tapered stub supporting structure as measured along the axial extent of said slow wave circuit.

7. The device of claim 6 wherein said taper is greater than 0.4% per period as measured along the axial extent of said slow wave circuit.

8. An electron discharge device including a slow wave circuit disposed along an elongated central beam axis comprising a stub supported ring and bar type slow wave circuit capable of propagating a band of high frequency energy along the axial extent thereof, said stub supported ring and bar type circuit adapted and arranged such that ring mode resonant circuit oscillations are capable of being supported thereon in a first particular portion of said band of high frequency energy, said stub supported ring and bar type slow wave circuit adapted and arranged such that stub mode resonant circuit oscillations are capable of being supported thereon in a second particular portion of said band of high frequency energy, said stub supported ring and bar circuit having means for suppressing said ring mode oscillations over said first particular portion of said band of high frequency energy, said stub supported ring and bar circuit having means for suppressing said stub mode oscillations over said second particular portion of said band of high frequency energy.

9. The device of claim 8 wherein said means for suppressing said ring mode resonant circuit oscillations involves constructing said rings such that the diameters thereof are dimensionally tapered along the axial extent of said slow wave circuit, and wherein said means for suppressing said stub mode oscillations involves constructing said stubs such that the transverse length dimensions thereof relative to said elongated central beam axis are dimensionally tapered along the axial extent of said slow wave circuit.

10. The device of claim 9 wherein the taper of said ring diameters is greater than 0.4% per period as measured along the axial extent of said slow wave circuit, and wherein the taper of said stub length dimensions is greater than 0.4% per period as measured along the axial extent of said slow wave circuit.

11. An electron discharge device including a slow wave circuit comprising a stub supported ring and bar type slow wave circuit capable of propagating a band of high frequency energy along the axial extent thereof, capacitive loading means spaced from and coupled to said slow wave circuit along the axial extent thereof, said capacitive loading means being periodic and adapted and arranged to suppress backward wave oscillations which in the absence of said capacitive loading means would otherwise be induced on said slow wave circuit at the particular frequency band within said band wherein said backward wave oscillations are normally induced.

12. The device of claim 11 wherein said capacitive loading means is a slotted ridge having a phase velocity approximately equal to the phase velocity of the ring and bar type slow wave circuit over the frequency band wherein said backward wave oscillations are normally induced.

13. The device of claim 11 wherein said capacitive loading means is an array of spaced pins having a phase velocity approximately equal to the phase velocity of the ring and bar type slow wave circuit over the frequency band wherein said backward wave oscillations are normally induced.

14. The device of claim 11 wherein said capacitive loading means is an array of spaced parallel planes having a phase velocity approximately equal to the phase velocity of the ring and bar type slow wave circuit over the frequency band wherein said backward wave oscillations are normally induced.

15. The device of claim 11 wherein said slow wave circuit has a periodic length defined by P and wherein said capacitive loading means are a plurality of spaced members having a periodicity approximately equal to ⅚ P whereby a stopband is introduced in said resultant loaded slow wave circuit at the particular frequency band within said band wherein said backward wave oscillations are normally induced.

16. An electron discharge device comprising an electron gun means, ring and bar type slow wave circuit means disposed about an elongated central beam axis and collector structure means, said means operatively connected to function as a traveling wave tube, said device being adapted and arranged such that it is capable of supporting higher order resonant circuit modes in addition to the fundamental operating mode, said device having means for raising the start oscillation current for said higher order resonant circuit modes to a level such that the operating beam current will not induce oscillations in said higher order resonant circuit modes whereby said device is stabilized with respect to said higher order resonant circuit modes, and wherein said means for raising the start oscillation current for said higher order resonant circuit modes includes a dimensional variation of the transverse circuit physical parameters relative to said elongated central beam axis along the circuit length.

17. The device as defined in claim 16 wherein said means for raising the start oscillation current for said higher order resonant circuit modes is said slow wave circuit means wherein said transverse dimensions thereof are tapered such that said higher order resonant circuit modes are suppressed at the operating beam current.

18. A traveling wave tube including a periodic slow wave circuit disposed along a predetermined line of circuit development and about an elongated central beam axis, said slow wave circuit being physically dimensioned by having the periodic transverse dimensional parameters relative to said central beam axis tapered along the axial circuit length such that the start oscillation current for higher order resonant circuit modes is increased relative to a dimensionally identical but non-tapered circuit.

References Cited

UNITED STATES PATENTS

| | | | |
|---|---|---|---|
| 2,584,162 | 2/1952 | Sensiper et al. | 333—9 |
| 2,825,841 | 3/1958 | Convert | 315—3.5 |
| 2,836,758 | 5/1958 | Chodorow | 315—3.6 |
| 2,846,612 | 8/1958 | Everhart | 315—3.5 |
| 2,848,689 | 8/1959 | Zaleski | 333—9 |
| 2,885,641 | 5/1959 | Birdsall et al. | 315—3.5 X |
| 2,901,712 | 8/1959 | Hogg | 333—33 |
| 2,957,103 | 10/1960 | Birdsall | 315—3.6 |
| 3,069,588 | 12/1962 | Skowron et al. | 315—39.3 X |
| 3,142,777 | 7/1964 | Sullivan | 315—3.5 |
| 3,181,024 | 4/1965 | Sensiper | 315—3.5 |

HERMAN KARL SAALBACH, *Primary Examiner.*

P. L. GENSLER, *Assistant Examiner.*